(12) United States Patent
Hyder et al.

(10) Patent No.: US 12,452,309 B2
(45) Date of Patent: Oct. 21, 2025

(54) THIRD-PARTY DECLARATIVE TRANSACTION VERIFICATION

(71) Applicant: Live Oak Banking Company, Wilmington, NC (US)

(72) Inventors: Brian Perry Hyder, Pittsboro, NC (US); Douglas Gage Miller, Raleigh, NC (US)

(73) Assignee: Live Oak Banking Company, Wilmington, NC (US)

( * ) Notice: Subject to any disclaimer, the term of this patent is extended or adjusted under 35 U.S.C. 154(b) by 293 days.

(21) Appl. No.: 18/179,852

(22) Filed: Mar. 7, 2023

(65) Prior Publication Data

US 2024/0305669 A1    Sep. 12, 2024

(51) Int. Cl.
*H04L 9/40* (2022.01)
(52) U.S. Cl.
CPC ............ *H04L 63/20* (2013.01); *H04L 63/102* (2013.01)
(58) Field of Classification Search
CPC ............................. H04L 63/20; H04L 63/102

USPC ............................................................ 726/1
See application file for complete search history.

(56) References Cited

U.S. PATENT DOCUMENTS

| 11,956,124 | B1* | 4/2024 | Gupta ................. H04L 41/0816 |
| 2017/0118167 | A1* | 4/2017 | Subramanya ......... H04L 63/101 |
| 2021/0200886 | A1* | 7/2021 | Ramamurthy ........ G06F 21/629 |

\* cited by examiner

*Primary Examiner* — Anthony D Brown
(74) *Attorney, Agent, or Firm* — Dority & Manning, P.A.

(57) ABSTRACT

A computing system includes a core system having an event engine and one or more interfaces; an authorization platform having authorization clients configured to maintain entitlement data, one or more event listeners, and one or more administration layer servers capable of configuring the one or more authorization clients; and a request router configured to route incoming electronic access requests to the authorization platform. The authorization platform can compute, by the event listener, that an entitlement event has occurred at the core system, communicate event data descriptive of the event to the one or more administration layer servers, communicate the event data to the one or more authorization clients, generate updated entitlement data based on the event data; and update the entitlement data based on the updated entitlement data.

20 Claims, 10 Drawing Sheets

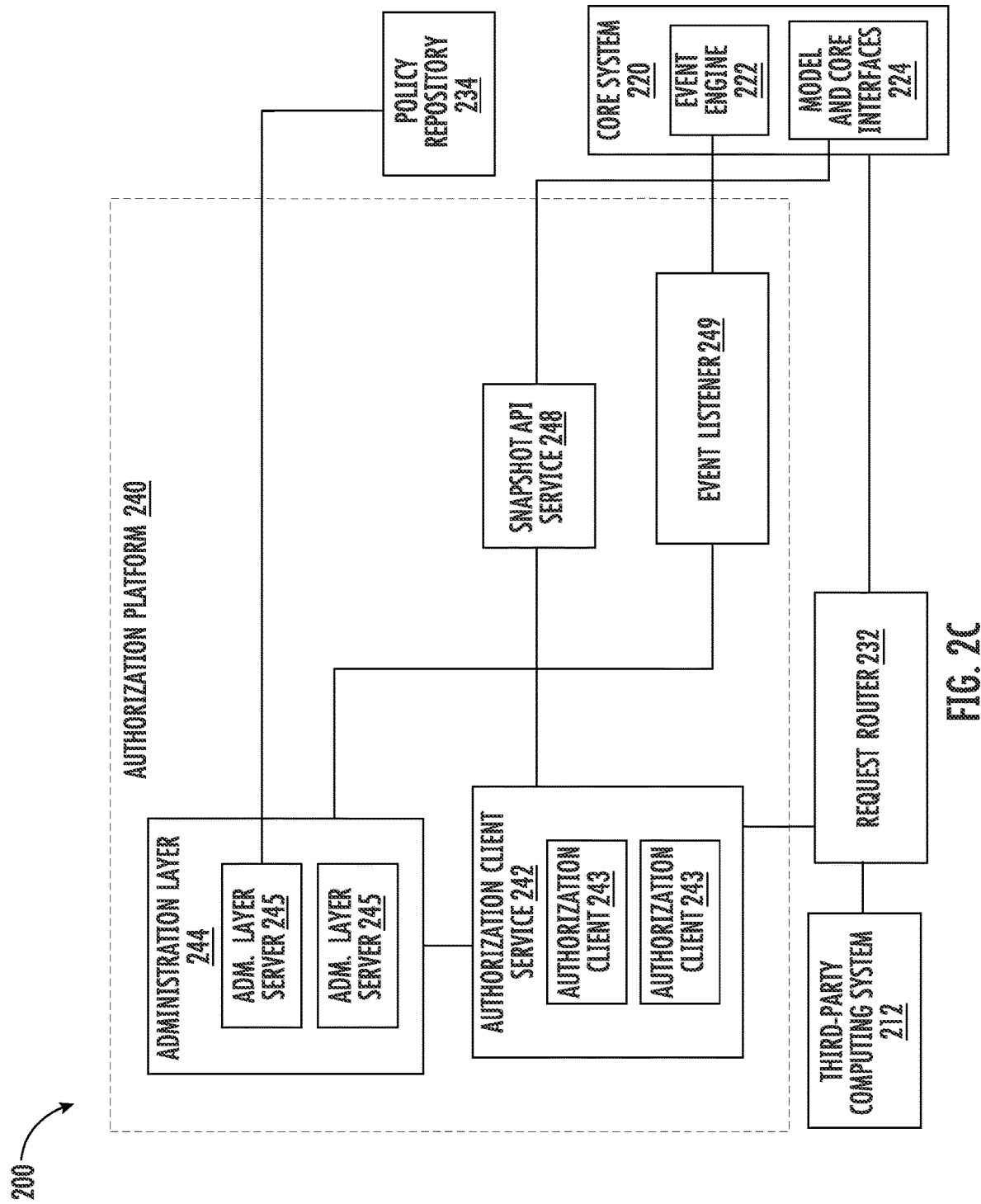

THIRD-PARTY DECLARATIVE TRANSACTION VERIFICATION

BACKGROUND

Transactional systems may utilize one or more core systems to manage a customer's accounts and transactions. The core systems can communicate via interfaces with other systems. Transactional systems including multiple core systems can quickly become complicated, as multiple systems may not seamlessly interface. Additionally, determining whether a user has proper authentication or entitlements can be complicated in that the multiple core systems can each maintain their own repository of user accounts and entitlements.

SUMMARY

The present disclosure is directed to third-party declarative transaction verification. A transactional system can include an authorization platform implemented by a policy engine. The authorization platform can maintain an entitlement repository including entitlement data that describes, separate from a core system, entitlement rules for customer identifiers and assets and/or actions on the core system. For example, the entitlement rules can describe which accounts are associated with a given customer identifier. Notably, the authorization platform can include an event listener configured to prompt updates to the entitlement data based on entitlement-modifying events at the core system. For example, when a customer identifier is associated with a new account, the core system can fire an event that associates the customer identifier with the new account. The event listener can then communicate event data to the authorization platform indicating that the customer identifier is associated with the new account. The authorization platform can then generate updated entitlement data associating the customer identifier with the new account. As used herein, "entitlements" refer to data and access control rules that define whether a given profile, such as a system, customer identifier, or other profile type, is permitted to access, modify, or otherwise perform actions associated with a given system resource, such as an account, another profile, an action type, or other resource.

The authorization platform is implemented using a policy engine implemented at one or more authorization clients. The authorization clients can each, or collectively, maintain the entitlement repository. For instance, in some cases, each authorization client may maintain a separate entitlement repository. An administration layer of the authorization platform can be tasked with initializing or instructing the authorization clients to maintain the entitlement repository. For instance, the administration layer can provide addresses for initialization instructions to the authorization clients, can direct the authorization clients to necessary data stores, and so on.

When a third-party sends an electronic access request to the transactional system, the system can verify that the customer identifier associated with the third-party is authorized and has necessary entitlements to perform the requested action. In particular, the system can access the entitlement data maintained at the entitlement repository. The system can use the entitlement data to compute an entitlement decision based on the entitlement data. If the entitlement decision indicates that the third-party is authorized to perform the requested action, then the transactional system can communicate the electronic access request to the core system. As used herein, an "entitlement decision" can refer to any schema, structure, data (e.g., Boolean), or other element that indicates whether an electronic access request is sufficiently entitled to request an electronic account action such that the transactional system will fulfil the request. As one example, the entitlement decision can be or can include a HTTP message, such as an allow message or a deny message. In this way, the system can verify the third-party without having to poll the core system for entitlements and authorization data.

Furthermore, in some implementations, the authorization platform can maintain an entitlement repository that is unified across multiple core systems. For example, if the transactional system includes multiple core systems (e.g., serving different customer sets, or from merged systems, or performing different services, etc.), the authorization platform can include event listeners configured to report events from some or all of the core systems. The authorization platform can thus update entitlement data based on events at each of the core systems at a single location, which can later be queried for making entitlement decisions.

Example implementations of the third-party declarative transaction verification can provide for a number of technical effects and benefits. For instance, by providing an authorization platform that maintains current entitlement data by listening to events from a core system, the system can verify the third-party without having to poll the core system for entitlements and authorization data. This can preserve computing resources at the core system that would otherwise be used for responding to the third-party's electronic access request, providing for the core system to reduce its computational overhead. This, in turn, can provide for improved performance of the core system and an improved user experience. Furthermore, maintaining entitlement data associated with multiple core systems at a single point of access in the entitlement repository can conserve computing resources that would be utilized in polling each core system separately.

For example, in an aspect, the present disclosure provides a computer-implemented method. The computer-implemented method includes initializing an authorization platform implemented by a policy engine, the authorization platform including an event listener configured to listen for events at a core system and one or more authorization clients storing entitlement data, the entitlement data including one or more entitlement rules. The computer-implemented method includes computing, by the event listener, that an event has occurred at the core system. The computer-implemented method includes computing, by the event listener, that the event is an entitlement event. The computer-implemented method includes communicating event data descriptive of the event to an administration layer of the authorization platform, the administration layer in communication with the one or more authorization clients. The computer-implemented method includes communicating the event data to the one or more authorization clients. The computer-implemented method includes generating, by the one or more authorization clients, updated entitlement data based on the event data. The computer-implemented method includes updating the entitlement data at the one or more authorization clients based on the updated entitlement data.

In some implementations of the computer-implemented method, initializing the authorization platform includes: retrieving one or more entitlement rules for the administration layer; communicating configuration information to each of the authorization clients, the configuration information describing instructions for retrieving entitlement data from the administration layer; requesting, by the authorization clients, the entitlement data using the configuration information; obtaining the entitlement data from the core system; and providing the entitlement data to the authorization clients.

In some implementations of the computer-implemented method, the authorization clients include Open Policy Agent clients.

In some implementations of the computer-implemented method, the administration layer includes an OPAL server.

In some implementations of the computer-implemented method, the entitlement data includes customer relationship data, account relationship data, or third-party authorization data.

In some implementations of the computer-implemented method, the core system includes a multiple core system.

For example, in an aspect, the present disclosure provides a computing system. The computing system includes a core system, the core system including an event engine and one or more interfaces, the event engine configured to publish events at the core system. The computing system includes an authorization platform, including: one or more authorization clients configured to maintain entitlement data of the core system in a cache separate from the core system, the entitlement data including one or more entitlement rules; one or more event listeners configured to listen to the event engine of the core system; and one or more administration layer servers capable of configuring the one or more authorization clients. The computing system includes a request router configured to route incoming electronic access requests to the authorization platform. The computing system includes one or more processors and one or more non-transitory, computer-readable media storing instructions that, when implemented, cause the one or more processors to perform operations. The operations include initializing the authorization platform; computing, by the event listener, that an event has occurred at the core system; computing, by the event listener, that the event is an entitlement event; communicating event data descriptive of the event to the one or more administration layer servers; communicating the event data to the one or more authorization clients; generating, by the one or more authorization clients, updated entitlement data based on the event data; and updating the entitlement data at one or more authorization clients based on the updated entitlement data.

In some implementations of the computing system, the operations further include: obtaining, by the request router, an electronic access request from a third-party computing system, the electronic access request associated with a third-party identifier and an electronic account action; accessing the entitlement data at the one or more authorization clients; computing an entitlement decision based on the entitlement data, the third-party identifier, and the electronic account action; computing that the entitlement decision is an allow decision; and in response to computing that the entitlement decision is an allow decision, communicating the electronic access request to the core system such that the core system can perform the electronic account action.

In some implementations of the computing system, the entitlement data includes customer relationship data, account relationship data, or third-party authorization data.

In some implementations of the computing system, the core system includes a single core system.

For example, in an aspect, the present disclosure provides a computer-implemented method. The computer-implemented method includes receiving, at a request router, an electronic access request from a third-party computing system, the electronic access request associated with a third-party identifier and an electronic account action performable at a core system separate from the request router. The computer-implemented method includes communicating, from the request router, the third-party identifier and the electronic account action to an authorization platform implemented by a policy engine, the authorization platform separate from the core system. The computer-implemented method includes accessing entitlement data associated with the core system, wherein the authorization platform includes one or more event listeners configured to determine whether an event has occurred at the core system, and wherein the authorization platform includes one or more authorization clients configured to update the entitlement data based on the event. The computer-implemented method includes computing an entitlement decision based on the entitlement data, the third-party identifier, and the electronic account action. The computer-implemented method includes performing an action associated with the core system based on the entitlement decision.

In some implementations of the computer-implemented method, computing the entitlement decision includes computing that an access token associated with the electronic access request is valid.

In some implementations of the computer-implemented method, computing the entitlement decision includes computing that the third-party computing system is authorized to act on behalf of the customer identifier.

In some implementations of the computer-implemented method, computing the entitlement decision includes computing that the third-party computing system is authorized to access one or more resources associated with the electronic account action.

In some implementations of the computer-implemented method, computing the entitlement decision includes computing that the third-party computing system is authorized to perform an action type of the electronic account action.

In some implementations of the computer-implemented method, the electronic access request includes an HTTP header, the HTTP header including the third-party identifier.

In some implementations of the computer-implemented method, the core system includes a multiple core system.

In some implementations of the computer-implemented method, performing an action associated with the core system based on the entitlement decision includes: computing that the entitlement decision is an allow decision; and in response to computing that the entitlement decision is an allow decision, communicating the electronic access request to the core system such that the core system can perform the electronic account action.

In some implementations of the computer-implemented method, computing that the entitlement decision is an allow decision includes at least one of: validating an access token associated with the electronic access request; verifying that the third-party computing system is authorized to act on behalf of a customer identifier; verifying that the third-party computing system is authorized to access one or more resources associated with the electronic account action; or verifying that the third-party computing system is authorized to perform an action type associated with the electronic account action.

In some implementations of the computer-implemented method, performing an action associated with the core system based on the entitlement decision includes: computing that the entitlement decision is a deny decision; and in response to computing that the entitlement decision is a deny decision, communicating a deny message to the third-party computing system.

Other example aspects of the present disclosure are directed to other systems, methods, apparatuses, tangible non-transitory computer-readable media, and devices for performing functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which:

FIGS. 2A-2C are block diagrams of an example transactional system, according to some implementations of the present disclosure;

DETAILED DESCRIPTION

With reference to FIGS. 1-8, example implementations of the present disclosure are discussed in further detail.

Figure 1:
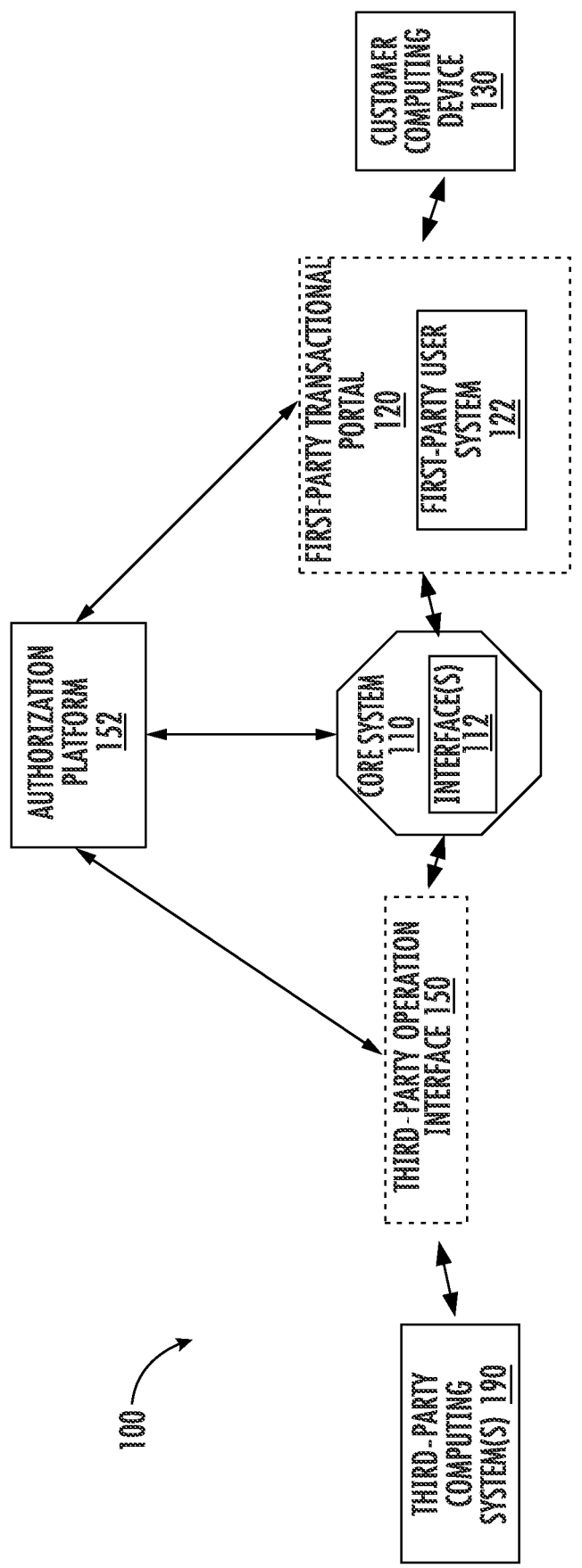
FIG. 1 is a block diagram of an example transactional system, according to some implementations of the present disclosure.

FIG. 1 is a block diagram of an example transactional system 100, according to some implementations of the present disclosure. The transactional system 100 can facilitate transactions on customer accounts managed by the transactional system 100, among other functionality. In particular, the transactional system 100 can include a core system 110. The core system 110 can be a back-end system that manages and performs transactions, account management, and/or other functionality associated with transactional operations, such as deposits, withdrawals, transfers, loan and credit processing, ledger keeping, account opening and closing, customer authorization, and/or other suitable functionality. In some implementations, the core system 110 may be implemented by a cloud computing system, such as a system distributed across multiple connected computing devices.

The core system 110 can include one or more interface(s) 112 that provide for external systems to interface with, access data within, and/or perform operations on core system 110. The interface(s) 112 can include, for example, one or more application programming interfaces (APIs) configured to provide access to specific resources or operations within the core system 110. As one example, the interface(s) 112 can include an event engine interface and/or model and core interfaces.

The transactional system 100 can additionally include a first-party transactional portal 120. The first-party transactional portal 120 can be operated by a same entity as the core system 110. The first-party transactional portal 120 can provide for customers of the operators of core system 110 to perform operations associated with accounts at the entity, such as transfers, deposits, etc. For instance, a customer computing device 130 owned and/or operated by a customer can communicate with the first-party transactional portal to perform operations on accounts associated with the customer. The first-party transactional portal 120 can include a first-party user system 122 that provides a unique user interface, user tools, etc. for facilitating communication between the core system 110 and the customer computing device 130. the customer computing device 130. For instance, a customer can input a username, password, and/or other authentication information through the customer computing device 130. The first-party user system 122 can validate the customer computing device 130 through any suitable authentication framework. For instance, the first-party user system 122 can provide the username, password, etc. to the authorization platform 152 to authenticate the customer computing device 130.

In addition to the first-party transactional portal 120, the transactional system 100 can include a third-party operation interface 150. The third-party operation interface 150 can facilitate operations at the core system 110 by third-parties, such as parties other than those operating the core system 110. For instance, the third-party operation interface 150 can provide for separation of interface functionality for first-party customers of the core system 110 and third-party customers of the core system 110. As one example, the third-party operation interface can provide for embedded banking functionality for third-parties.

A third-party computing system 190 can send an electronic access request to the third-party operation interface 150. The third-party computing system 190 can intend to access the core system 110 to perform an electronic account action, such as a transfer, deposit, withdrawal, etc. To determine whether the third-party computing system 190 is authorized to perform the electronic account action or has proper entitlements to resources associated with the electronic account action, the third-party operation interface can provide data associated with the electronic access request to the authorization platform 152. The authorization platform can determine whether the third-party computing system 190 is authorized and entitled to perform the electronic account action, as described herein. The authorization platform 152 can compute an entitlement decision regarding the third-party computing system 190. If the entitlement decision is an allow decision, the electronic account action can be performed by the core system 110.

Figure 2A:
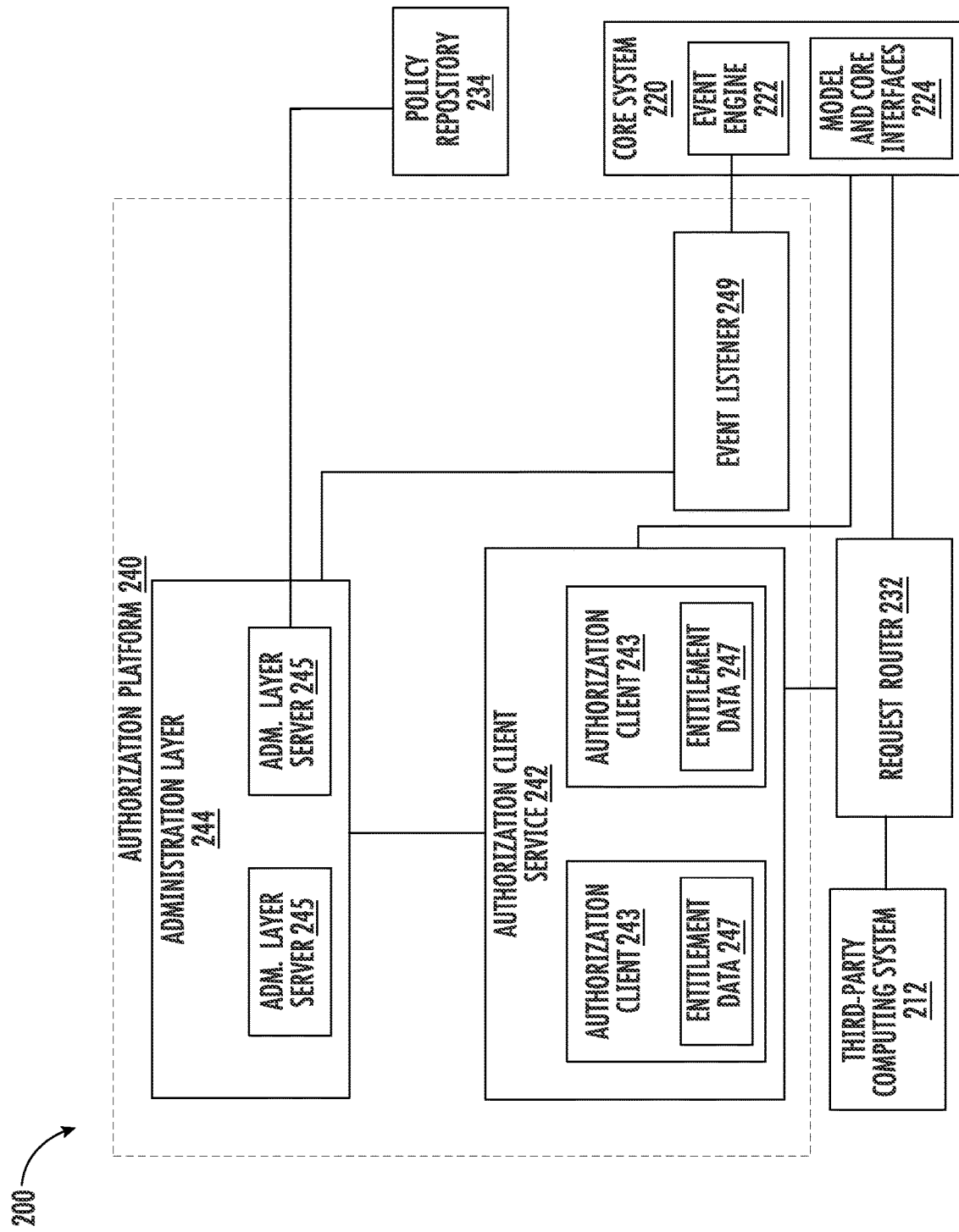

FIG. 2A is a block diagram of an example transactional system 200, according to some implementations of the present disclosure. The example transactional system 200 can be configured to verify electronic access requests from a third party computing system 212. The third party computing system 212 can be any suitable computing system, such as a server computing system, a personal computing system, and/or any other suitable computing system. The transactional system 200 can additionally include a core system 220. The core system 220 can be a transactional core used to perform transactions, such as withdrawals, deposits, transfers, account creation, account closing, addition or removal of authorized users, and or any other suitable transactions.

The transactional system 200 can additionally include an authorization platform 240. The authorization platform 240 can include an authorization client service 242. The authorization client service 242 can include one or more authorization clients 243 providing the authorization client service 242. The one or more authorization clients 243 can be implemented by a policy engine. As one example, the authorization client service 242 can implement the Open Policy Agent (OPA) policy engine.

The authorization clients 243 can maintain entitlement data 247. In particular, in some implementations, each authorization client 243 can include and/or maintain a current representation of authorization and entitlement data 247, referred to simply as entitlement data for the purposes of illustration, associated with the core system 220. In particular, the entitlement data 247 can include data describing entitlements associated with customer identifiers at the core system 220. As one example, the entitlement data 247 may include a correlation between a given customer identifier and one or more accounts owned, managed, or otherwise accessible by that given customer identifier.

The entitlement data 247 can be any suitable data for describing, configuring, or otherwise managing entitlements within the transactional system 200. For instance, in some implementations, the entitlement data 247 can include data describing relationships between a third-party identifier or customer identifier and one or more entitlements possessed by the identifier, such as, for example, accounts that the identifier has access to, permissions within each account that the identifier has access to, resources within the core system 220 that the identifier can access, operations that can be performed by the identifier, and other suitable entitlements. As one example, the entitlement data 247 can include a data structure having an entity identifier (e.g., a customer identifier and/or a third-party identifier) and a list of account identifiers, action identifiers, and other entitlement identifiers associated with the given entity identifiers. Data structures for each entity identifier can be grouped in a table, linked list, or other suitable data structure.

Although the entitlement data 247 is illustrated as separate from the core system 220, the entitlement data 247 can represent entitlements at the core system 220. According to aspects of the present disclosure, the entitlement data 247 can be updated by the authorization client service 242 based on events observed at core system 220. In this way, the entitlement data 247 can represent a current state of entitlements at the core system 220. The entitlement data 247 can therefore be a reliable source of entitlements for transactions requested by third party computing systems 212. In addition, accessing the entitlement data 247 can require fewer computing resources than polling the core system 220 for its entitlements. For instance, as opposed to a polling-based approach where the core system 220 is polled to authenticate each transaction, querying the authorization clients 243 can expedite validation of entitlements or reduce computational overhead at the core system 220 associated with validating those transactions.

In addition, the authorization platform 240 can include an administration layer 244 having one or more administration layer servers 245. The administration layer 244 can orchestrate initialization, configuration, and updates to the authorization client service 242 (e.g., the authorization clients 243). In some implementations, the administration layer 244 can implement a policy engine. For instance, in some example implementations, the authorization clients 243 can be Open Policy Agent (OPA) clients and the administration layer servers 245 can be OPAL servers.

Additionally, the administration layer 244 can access a policy repository 234 which maintains a list of policy rules for the transactional system 200. In some implementations, the policy repository 234 can be a GitHub repository or other suitable repository. In some implementations, different policy rules are tied to different customer identifiers or different third party providers accessing the authorization platform 240. In some implementations, different policy repositories 234 can be used for distinct customer groups.

In some cases, the authorization clients 243 can be initialized by the administration layer 244. For instance, although the authorization clients 243 can be updated based on events from event engine 222, an initial state of the entitlement data 247 can be established before any events are received. In particular, the administration layer 244 can be tasked with initializing and maintaining the authorization clients 243. For example, the administration layer 244 can initialize the authorization clients 243 with network addresses corresponding to relevant data that will be accessed by the authorization client 243 during operation of the authorization platform 240. To initialize the authorization clients 243, it can be necessary to determine a current state of entitlement data within the core system 220. As one example, the administration layer 244 can provide the authorization clients 243 with network addresses to the event listener 249, the policy repository 234, the core system 220 itself, or any other suitable locations that will be accessed by the authorization clients 243 during their initialization or operation. In addition, in some implementations, the administration layer 244 can bring the administration clients 243 online or offline when necessary.

In some implementations, each of the authorization clients 243 can have a maximum lifespan. For instance, when a new authorization client 243 is created or brought online (e.g., by the administration layer 244), the authorization client 243 can be given a maximum lifespan for which it will be operational. After the maximum lifespan has elapsed, the authorization client 243 will be brought offline (e.g., by the administration layer 244). In some cases, a new authorization client 243 can then take the place of the expired authorization client 243. When the new authorization client 243 is brought online, it will be initialized with the current state of entitlements at the core system 220. This can provide an additional layer of protection against outdated entitlement data, as this will periodically force a refresh of the entitlement data as new authorization clients 243 are brought online.

The core system 220 can include an event engine 222 that is configured to publish events from the core system 220. In some cases, the events can be entitlement events that signal modifications to account entitlements at the core system 220. For example, entitlement events can include events such as account openings or closings, account ownership transfers from one customer to another, addition or removal of authorized users, or other events whereby the entitlements associated with a given customer are modified. In addition to entitlement events, the event engine 222 can publish events such as account withdrawals or deposits, balance transfers, or other suitable events.

Events published by event engine 222 can be observed by an event listener 249 of the authorization platform 240. For instance, the event listener 249 can be configured to consume outputs from the event engine 222 and/or relay events to the administration layer 244 and/or, in some implementations, the authorization client service 242 directly. In some implementations, the event listener 249 can relay each event that occurs to the administration layer 244 or the authorization client service 242. In some implementations, however, the event listener 249 can first determine that an event is an entitlement event before relaying information about the event to the rest of the authorization platform 240. In some implementations, the core system 220 can publish events in near-real-time, which can provide for the authorization platform 240 (e.g., the administration layer 244) to update the entitlement data 247 in near-real-time. Updating the entitlement data 247 in near-real-time can reduce the chance that an entitlement decision is based on outdated entitlement data.

In addition to the event engine 222, the core system can include one or more model and core interfaces 224. The model and core interfaces 224 can allow external systems to communicate with the core system 220 and initiate or perform various actions or interactions with the core system 220. For example, an external system may perform an electronic account action at the core system 220 by interfacing with the model and core interfaces 224.

The transactional system 200 can determine whether the third-party computing system 212 can access the core system 220 (e.g., the model and core interfaces 224) using the authorization platform 240. The third-party computing system 212 can communicate an electronic access request, seeking to access the core system 220. The electronic access request can include information such as a third-party identifier that uniquely identifies the third-party computing system 212, a customer identifier that the third-party computing system 212 is accessing the core system 220 on behalf of, an electronic account action to be performed by the core system 220, an access token associated with the electronic access request, or other identifier information such as a timestamp, expiry, device address (e.g., of origin/destination), and so on.

The electronic access request from the third-party computing system 212 can be received by request router 232. The request router 232 can act as a gateway between third party computing systems 212 and the core system 220, such that the third party computing systems 212 do not access the core system 220 directly. When the request router 232 receives the electronic access request, it can provide information about the electronic access request, such as the customer identifier, electronic account action, access token, etc., and/or the request itself, to the authorization platform 240.

The authorization platform 240 can compute an entitlement decision for whether the third-party computing system 212 can access the core system 220. For instance, the entitlement decision can determine whether the request router 232 forwards the electronic access request to the core system 220 (e.g., to the model and core interfaces 224) or rejects the electronic access request. In some implementations, if the authorization platform 240 rejects the electronic access request, the request router 232 and/or another system can communicate a deny message to the third-party computing system 212. The deny message can inform the third-party computing system 212 that the electronic access request was rejected. In some implementations, the deny message can include a reason why the electronic access request was rejected, such as data informing the third-party computing system 212 that it lacked proper entitlements.

In particular, the authorization platform 240 can access the entitlement data 247. Additionally and/or alternatively, the authorization platform 240 can access one or more policy rules from the policy repository 234, which may be cached at the authorization clients 243. Based on the entitlement data 247 and data from the electronic access request, such as the third-party identifier, customer identifier, electronic account action, access token, etc., the authorization platform 240 can determine whether the entitlement decision is an allow decision or a deny decision. For example, the authorization platform 240 can determine whether the access token associated with the electronic access request is valid (e.g., matches the customer identifier, timestamp, expiry, etc.).

As another example, the authorization platform can determine that the third-party computing system 212 is authorized to act on behalf of the customer identifier of the electronic access request. For example, the entitlement data 247 can include relationships between customer identifiers and recognized third-party intermediaries (e.g., transactional service providers). The authorization platform 240 can compare the third-party identifier of the third-party computing system 212 or the customer identifier to the relationships of the entitlement data 247 to determine whether the third-party computing system is associated with the customer identifier and entitled to act on behalf of the customer associated with the customer identifier. Additionally, in some cases, the third-party computing system 212 may request to perform an electronic account action without providing a customer identifier. For instance, the third-party computing system 212 may request a list of all customer identifiers associated with the third-party computing system.

As another example, the authorization platform 240 can determine that the third-party computing system 212 and/or the customer identifier is authorized (e.g., entitled) to access one or more resources associated with the electronic account action. For instance, the entitlement data 247 can include relationship data between customer identifiers and resources (e.g., accounts) that the customer identifiers are entitled to access, such as account relationship data defining relationships between customer identifiers and accounts. The authorization platform 240 can compare the relationships of the entitlement data 247 to the customer identifier and resources of the electronic access request to determine whether the customer identifier is permitted to access the resources in the electronic access request.

As another example, the authorization platform 240 can determine whether the third-party computing system 212 and/or customer identifier is authorized to perform an action type of the electronic account action. For instance, the electronic account action can have one or more action types specifying the type of action to be performed by the core system 220, such as an account association, transfer, withdrawal, closing, opening, or other action. The entitlement data 247 can define action type relationships between third-party computing systems 212, customer identifiers, and/or permitted action types for the given third-party computing system 212 or customer identifier. In some implementations, the action type relationships may further be defined relative to specific accounts. For instance, a given customer can have entitlements for a first set of action types for a first account associated with the customer identifier and a second set of action types for a second account associated with the customer identifier.

Figure 2B:
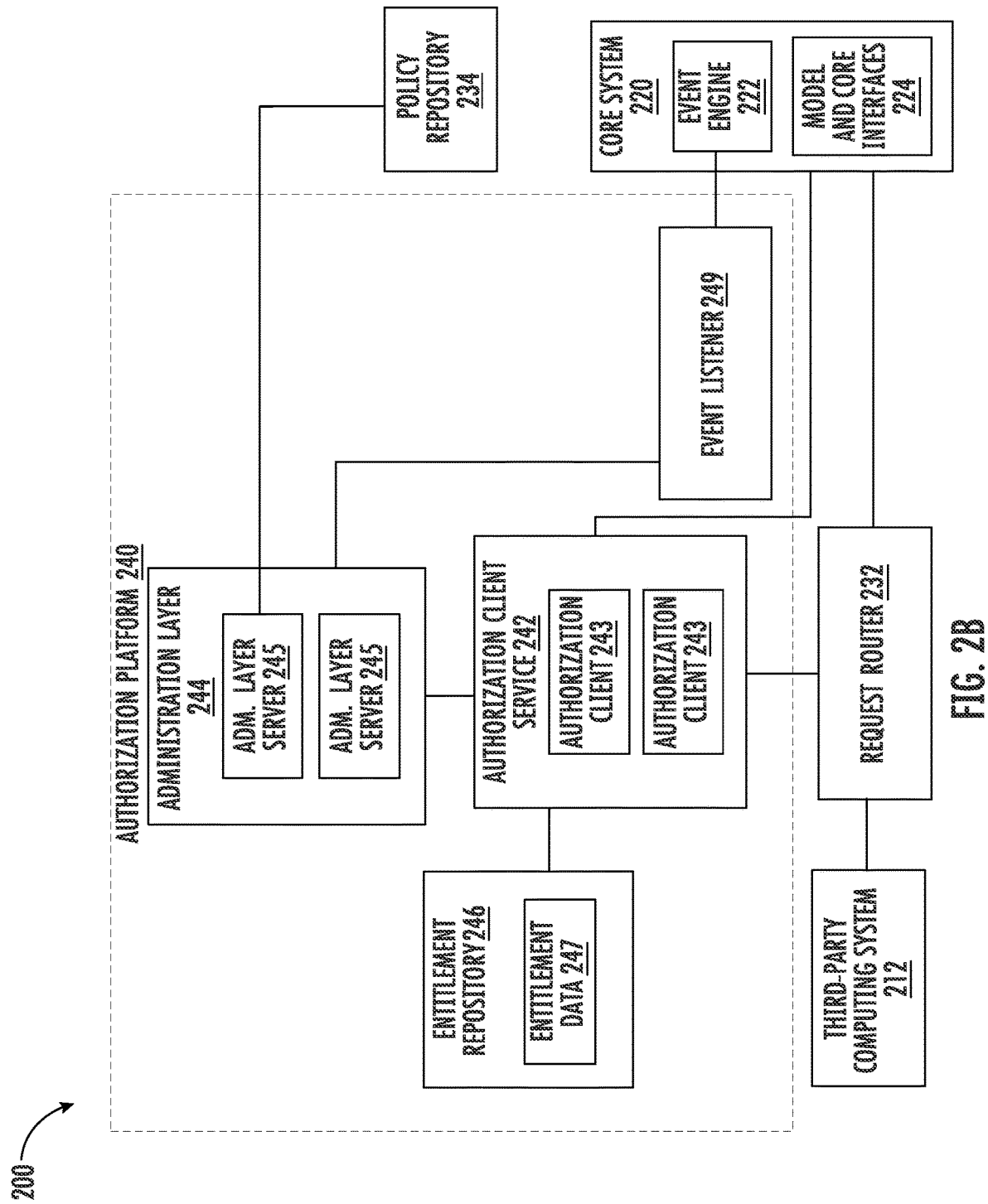

FIG. 2B is a block diagram of an example transactional system 200 where the one or more authorization clients 243 maintain an entitlement repository 246 including entitlement data 247. The entitlement repository 246 is illustrated as being separate from the authorization client service 242 for the purposes of illustration. However, the entitlement repository 246 can be implemented at a same computing system as any of the other elements of authorization platform 240 such as the authorization client service 242, the administration layer 244, or any other suitable computing system.

The authorization clients 243 can maintain a near-real-time cache of entitlement data 247 in the entitlement repository 246. For instance, compared to the embodiment of FIG. 2A wherein each of the authorization clients 243 separately maintained a cache of entitlement data 247, in the embodiment of FIG. 2B the authorization clients 243 are collectively orchestrated to maintain the entitlement repository 246. For instance, the authorization clients 243 may provide redundant functionality for updating the entitlement repository 246. As another example, each authorization client 243 may be tasked with updating at least a portion of the entitlement data 247 of the entitlement repository 246.

FIG. 2C is a block diagram of an example transactional system 200 including a snapshot API service 248. The snapshot API 248 can provide an interface that obtains the latest state of entitlement data from the core system 220. In particular, the snapshot API 248 can directly poll the core system 220 to determine the current state of entitlement data. The snapshot API 248 can maintain a list of addresses within the core system 220 for each piece of relevant entitlement data, such as policy lists, account relationships, etc. The current state of entitlement data at the core system 220 can therefore be provided by the snapshot API 248 directly to the administration layer 244 without providing the administration layer 244 with service credentials for access to the core system 220. In this way, the snapshot API 248 can preserve security integrity of the core system 220.

In particular, in some implementations, the snapshot API 248 can be used during initialization or recovery of the authorization clients 243. For instance, in some implementations, rather than providing direct addresses to the core system 220 for initialization of the authorization clients 243, the administration layer 244 may instead provide the address of the snapshot API 248. The authorization clients 243 can then access the snapshot API service 248 on initialization to establish an initial state of entitlement data 247.

Figure 3:
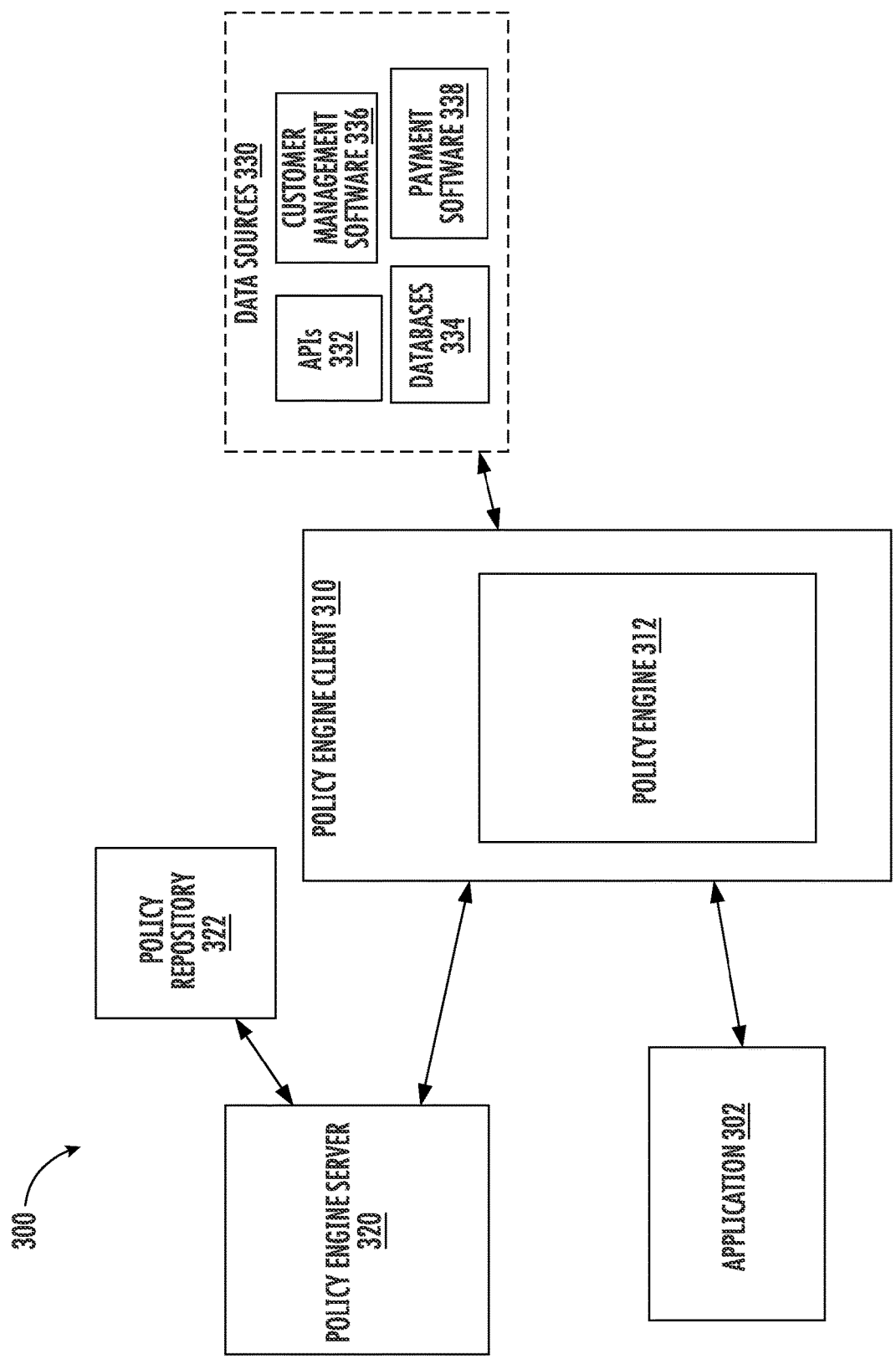
FIG. 3 is a block diagram of an example policy engine implementation, according to some implementations of the present disclosure.

FIG. 3 is a block diagram of an example system 300 implementing a policy engine, according to some implementations of the present disclosure. The system 300 can include a policy engine client 310. The policy engine client 310 can implement an instance of a policy engine 312. The policy engine 312 can cause the policy engine client 310 to perform operations for managing policies of an application 302, such as entitlement policies for the application 302. The application 302 can be any suitable application, such as applications on a core system (e.g., the core system 220 of FIG. 2). The policy engine client 310 can manage entitlements for the application 302 regarding a variety of data sources 330, such as, but not limited to, APIs 332, databases 334, customer management software 336, financial software 338, and/or other suitable data sources 310. In some implementations, the policy engine 312 can be Open Policy Agent.

The policy engine client 310 can be initialized and/or managed by a policy engine server 320. The policy engine server 320 can manage one or more policy engine clients 310 at a given time. In particular, the policy engine server 320 can configure the policy engine 312 when the policy engine client 310 is brought online. For example, the policy engine server 320 can configure the policy engine 312 based on one or more policy rules at policy repository 322. Additionally and/or alternatively, the policy engine server 320 can manage a lifecycle of the policy engine client 310.

In some implementations, the policy engine server 320 can be an OPAL server of the Open Policy Agent. The policy engine server 320 can be implemented by any suitable server architecture, such as a cloud environment.

Figure 4:
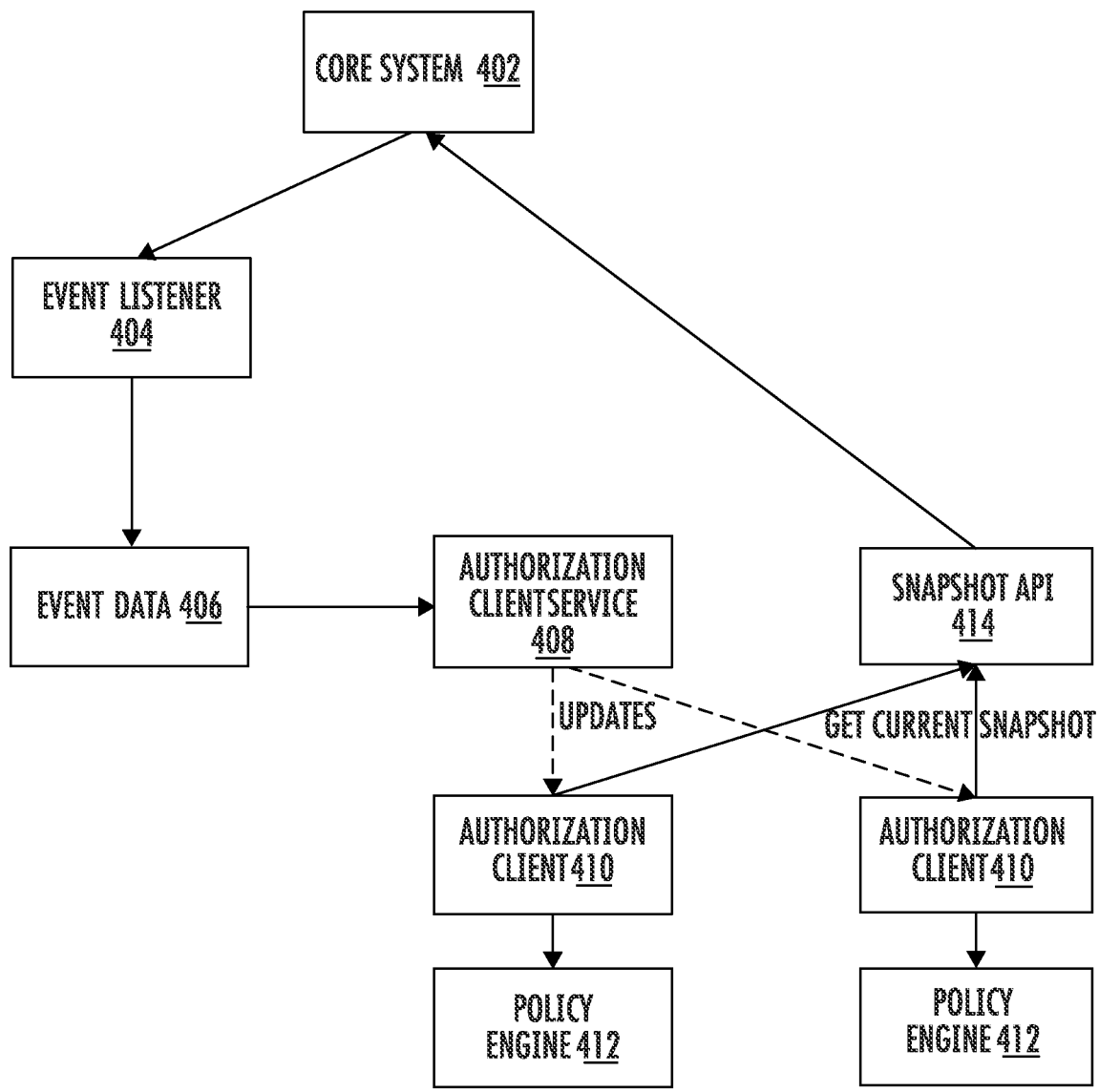
FIG. 4 is a data flow diagram for an example transactional system, according to some implementations of the present disclosure.

FIG. 4 is a data flow diagram for an example transactional system 400, according to some implementations of the present disclosure. The core system 402 can produce entitlement events, which are picked up by event listener 404. The event listener 404 can pass event data 406 descriptive of changes in entitlement data from the events to the authorization client service 408. The authorization client service 408 can be in communication with one or more authorization clients 410. The authorization clients 410 can each implement a policy engine 412. The authorization clients can update an entitlement repository based on the event data 406. The authorization clients 410 can be initialized by calling the snapshot API 414, which fetches a current state of the entitlement data from the core system 402. This snapshot can then be updated as new events occur at the core system 402.

Figure 5:
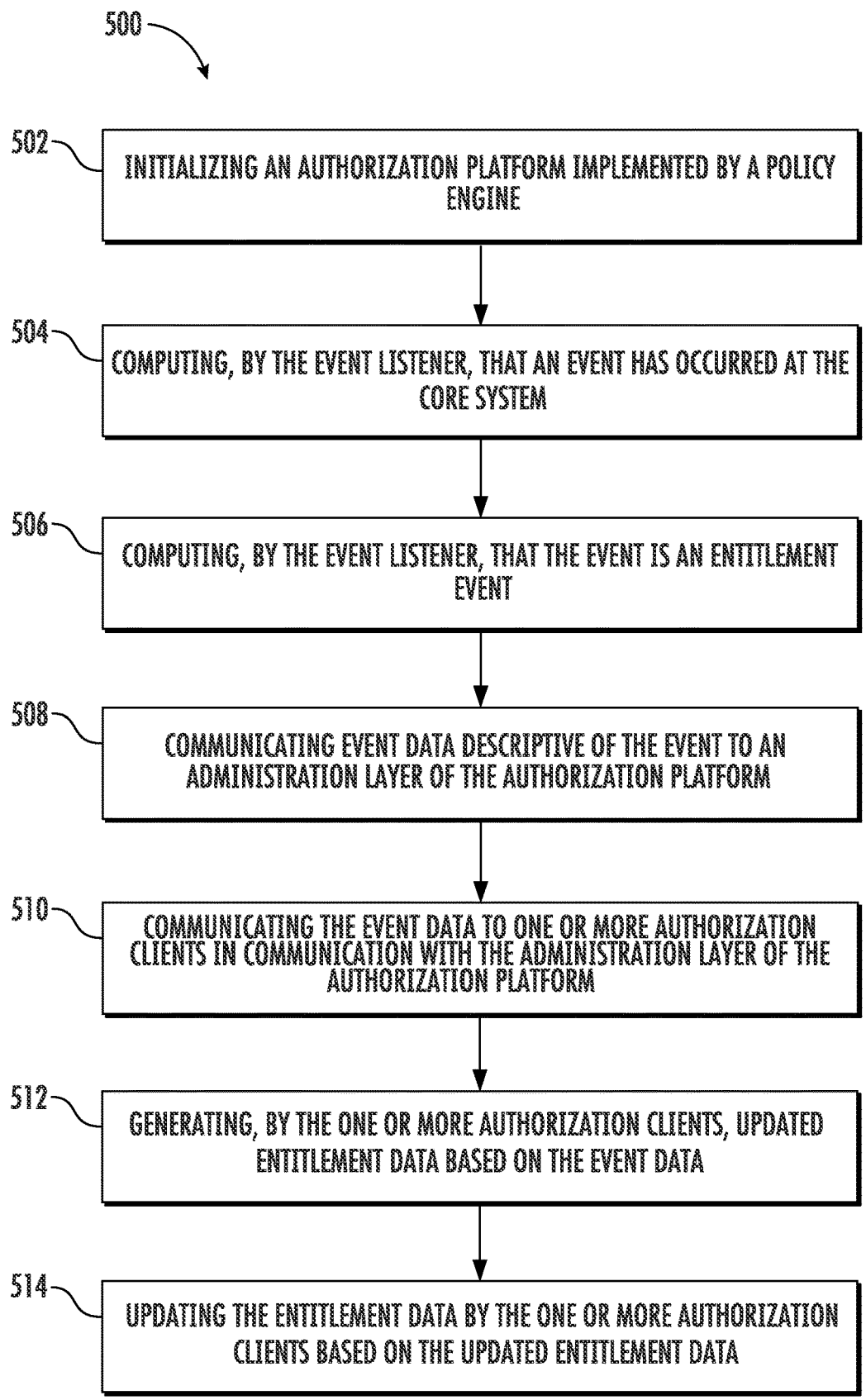
FIG. 5 is a flowchart of an example method according to some implementations of the present disclosure.

FIG. 5 depicts a flowchart of a method 500 for third-party declarative transaction verification according to aspects of the present disclosure. One or more portion(s) of the method 500 can be implemented by a computing system that includes one or more computing devices such as, for example, the computing systems described with reference to the other figures (e.g., as in FIGS. 1, 2, 3, 8, etc.). Each respective portion of the method 500 can be performed by any (or any combination) of one or more computing devices. Moreover, one or more portion(s) of the method 400 can be implemented on the hardware components of the device(s) described herein (e.g., as in FIGS. 1, 2, 3, 8, etc.). FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 5 is described with reference to elements/terms described with respect to other systems and figures for exemplary illustrated purposes and is not meant to be limiting. One or more portions of method 500 can be performed additionally, or alternatively, by other systems.

At 502, the method 500 includes initializing an authorization platform implemented by a policy engine. As used herein, initializing the authorization platform can include bringing the authorization platform online, resetting the authorization platform, bringing one or more resources in the authorization platform online (e.g., one or more authorization clients), or other suitable initialization task. The policy engine can be any suitable policy engine, such as Open Policy Agent (OPA). The policy engine, such as OPA, can provide a unified toolset and framework for providing policy language, policy models, policy APIs, etc. for one or more services, such as transactional services. The policy engine can provide a high-level declarative language that facilitates specifying policy as code or APIs to offload policy decision-making from the core software.

The authorization platform can include an event listener configured to listen for events at a core system and one or more authorization clients storing entitlement data. For instance, the event listener can be configured to consume outputs from an event engine of the core system. In some implementations, each authorization client can separately or collectively update the entitlement data based on events that occur at a core system. For instance, in some implementations, each authorization client can separately maintain a cache of entitlement data. Alternatively, in some implementations, the authorization clients may be orchestrated (e.g., by an administration layer) to collectively maintain an entitlement repository. In some implementations, the authorization clients can include Open Policy Agent clients.

The entitlement data can include one or more entitlement rules. For instance, the entitlement rules can define permissions regarding customer identifiers, action types, account identifiers, or other suitable data within the core system. As one example, in some implementations, the entitlement data can include relationship data defining relationships between third-party identifiers or customer identifiers and entitlements, such as accounts, action types, etc. As another example, the entitlement data can include account relationship data defining relationships between account identifiers and entitlements, such as customer identifiers, action types, etc. As another example, the entitlement data can include third-party authorization data defining entitlements for certain third-party computing systems (e.g., third-party providers). As an example, a given third-party provider can be authorized on behalf of some subset of customer identifiers serviced by that third-party provider.

In some implementations, the authorization platform can include an administration layer. The administration layer can manage, initialize, active or deactivate, and/or otherwise control the authorization clients. For instance, the administration layer can include one or more administration layer servers that can be in communication with the authorization clients. In some implementations, the administration layer can include one or more OPAL servers.

In some implementations, initializing the authorization platform can include retrieving one or more entitlement rules for the administration layer; optionally establishing a snapshot API to receive requests from authorization clients and communicate with the core system; communicating configuration information to each of the authorization clients, the configuration information describing instructions for retrieving entitlement data from the administration layer; requesting, by the authorization clients, the entitlement data from the snapshot API; obtaining, by the snapshot API, the entitlement data from the core system; and providing the entitlement data to the authorization clients. An example method for initializing the authorization platform is discussed in more detail with respect to FIG. 6 below.

In some implementations, the core system is a single core system. Managing a single core system using an authorization platform can be beneficial, as a single core system can provide a more uniform dataset of customers and accounts. Additionally or alternatively, in some implementations, the core system is a multiple core system. For instance, in some cases, multiple core systems are included in a transactional systems. Systems and methods described herein can be extended to multiple core systems. Systems and methods described herein can be especially beneficial in providing a unified access point for multiple core systems. For instance, providing a unified access point for multiple core systems can reduce computing resource usage associated with polling multiple core systems when determining entitlements for a third-party with access to multiple core systems by providing a single location which may be polled for determining entitlements.

At 504, the method 500 includes computing, by the event listener, that an event has occurred at the core system. In some implementations, the event listener can relay each event that occurs to the authorization platform. In some implementations, however, the method 500 can include, at 506, computing, by the event listener, that the event is an entitlement event. For instance, the event can have an event type or other classifier that can be observed by the event listener. The event listener can compare the event type to a known set of event types corresponding to entitlement events.

At 508, the method 500 includes communicating event data descriptive of the event to an administration layer of the authorization platform. For instance, in some implementations, the event listener can communicate the event as observed from the event engine. In some implementations, however, the event listener can generate the event data by extracting the event data from the event provided by the event engine. As an example, the event listener can extract certain data such as an account identifier corresponding to the event, a customer identifier corresponding to the event, etc. from the event engine and consolidate this data into the event data. At 510, the method 500 includes communicating the event data to one or more authorization clients in communication with the administration layer of the authorization platform. For instance, the administration layer can determine which of the one or more authorization clients to forward the event data to.

At 512, the method 500 includes generating, by the one or more authorization clients, updated entitlement data based on the event data. For instance, the event data can describe updates to be made to the entitlement data. The authorization clients can generate updated entitlement data by applying the described updates to the entitlement data. In some implementations, the authorization clients can access the locally-stored entitlement data (e.g., stored locally at the authorization clients) and apply the described updates to the locally-stored entitlement data to generate the updated entitlement data.

At 514, the method 500 includes updating the entitlement data by the one or more authorization clients based on the updated entitlement data. For instance, the authorization clients can replace the original locally-stored entitlement data with the updated entitlement data. The authorization clients may each update entitlement data stored locally at each authorization client. Alternatively, the authorization clients may operate in tandem to update a common entitlement data repository. In some implementations, the entitlement data may be versioned and/or changes to the entitlement data can be logged such that an operator of the authorization platform can trace changes to the entitlement data over time. Logging or versioning the entitlement data can be useful for assessing unauthorized or improper changes to the entitlement data.

Figure 6:
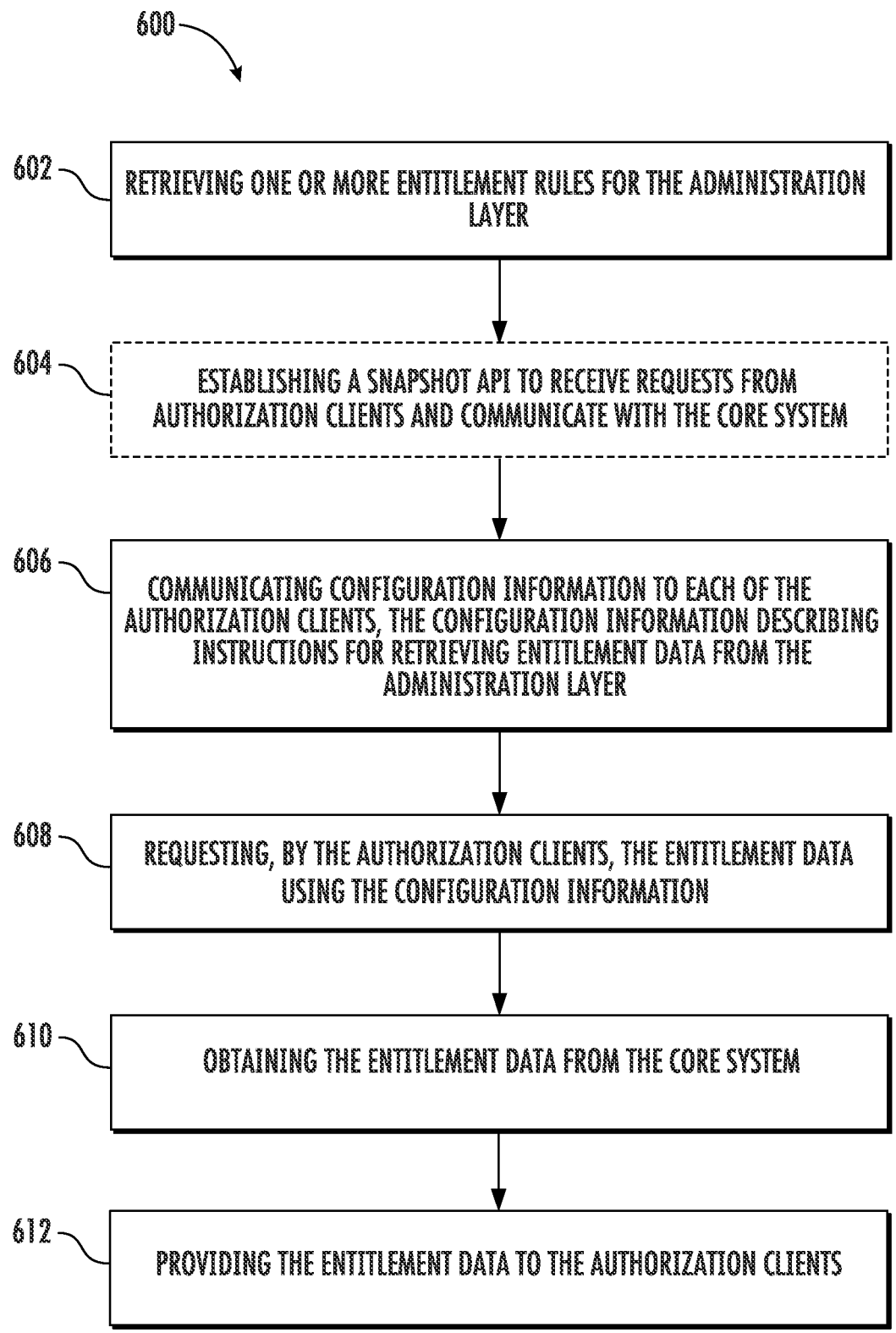
FIG. 6 is a flowchart of an example method according to some implementations of the present disclosure.

FIG. 6 depicts a flowchart of a method 600 for initializing an authorization platform according to aspects of the present disclosure. One or more portion(s) of the method 600 can be implemented by a computing system that includes one or more computing devices such as, for example, the computing systems described with reference to the other figures (e.g., as in FIGS. 1, 2, 3, 8, etc.). Each respective portion of the method 600 can be performed by any (or any combination) of one or more computing devices. Moreover, one or more portion(s) of the method 400 can be implemented on the hardware components of the device(s) described herein (e.g., as in FIGS. 1, 2, 3, 8, etc.). FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 6 is described with reference to elements/terms described with respect to other systems and figures for exemplary illustrated purposes and is not meant to be limiting. One or more portions of method 600 can be performed additionally, or alternatively, by other systems.

At 602, the method 600 includes retrieving one or more entitlement rules for the administration layer. For instance, the administration layer can access a policy repository storing the one or more entitlement rules. The policy repository can be implemented by any suitable repository technology, such as GitHub repositories.

At 604, the method 600 optionally includes establishing a snapshot API to receive requests from authorization clients and communicate with the core system. For instance, establishing the snapshot API can include configuring one or more addresses associated with interfaces of the core system. The snapshot API can provide an interface that obtains the latest state of entitlement data from the core system. In particular, the snapshot API can directly poll the core system to determine the current state of entitlement data. The snapshot API can maintain a list of addresses within the core system for each piece of relevant entitlement data, such as policy lists, account relationships, etc. The current state of entitlement data at the core system can therefore be provided by the snapshot API directly to the administration layer without providing the administration layer with service credentials for access to the core system. In this way, the snapshot API can preserve security integrity of the core system.

Alternatively to establishing a snapshot API, in some implementations, the authorization clients may be directly configured with addresses associated with the interfaces of the core system. For instance, the authorization clients may be configured to directly poll the core system to obtain the latest state of entitlement data from the core system.

At 606, the method 600 includes communicating configuration information to each of the authorization clients. The configuration information can describe instructions for retrieving entitlement data from the administration layer. For example, the administration layer can initialize the authorization clients with configuration information including network addresses corresponding to relevant data that will be accessed by the authorization client during operation of the authorization platform. As one example, the administration layer can provide the authorization clients with network addresses to the event listener, the snapshot API, the policy repository, the core system itself, or any other suitable locations that will be accessed by the authorization clients. In addition, in some implementations, the administration layer can bring the administration clients online or offline when necessary.

At 608, the method 600 includes requesting, by the authorization clients, the entitlement data using the configuration information. In response to requesting the entitlement data, the method 600 can include, at 610, obtaining the entitlement data from the core system, and, at 612, providing the entitlement data to the authorization clients. For instance, although the authorization clients can be updated based on events from event engine, it can still be necessary to establish an initial state of the entitlement data before any events are received. The authorization clients can therefore obtain (e.g., directly and/or by the snapshot API) a current state of the entitlement data. The authorization clients can then update the entitlement data based on events from the event engine, as described with respect to FIG. 5.

Figure 7:
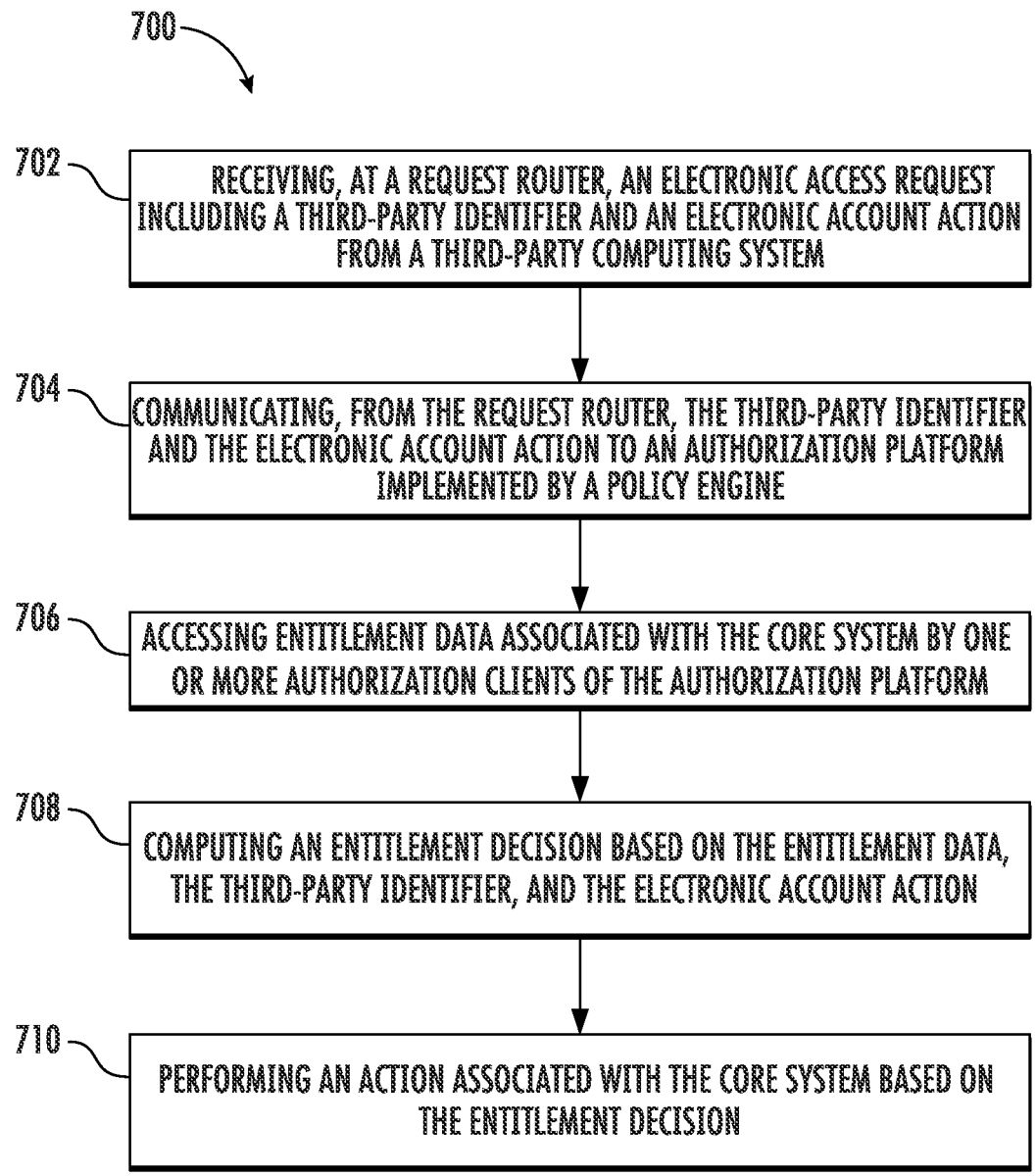
FIG. 7 is a flowchart of an example method according to some implementations of the present disclosure.

FIG. 7 depicts a flowchart of a method 700 for initializing an authorization platform according to aspects of the present disclosure. One or more portion(s) of the method 700 can be implemented by a computing system that includes one or more computing devices such as, for example, the computing systems described with reference to the other figures (e.g., as in FIGS. 1, 2, 3, 8, etc.). Each respective portion of the method 700 can be performed by any (or any combination) of one or more computing devices. Moreover, one or more portion(s) of the method 400 can be implemented on the hardware components of the device(s) described herein (e.g., as in FIGS. 1, 2, 3, 8, etc.). FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems.

At 702, the method 700 includes receiving, at a request router, an electronic access request from a third-party computing system. The request router can act as a gateway between third party computing systems and the core system, such that the third party computing systems do not access the core system directly. The third-party computing system can communicate an electronic access request, seeking to access the core system. The electronic access request can include information such as the third-party identifier that is communicating the electronic access request (e.g., associated with the third-party computing system, a customer identifier that the core system is accessed on behalf of, an electronic account action to be performed by the core system, an access token associated with the electronic access request, or other identifier information such as a timestamp, expiry, device address (e.g., of origin/destination), and so on. In particular, in some implementations, the electronic access request can be associated with a third-party identifier and an electronic account action performable at a core system separate from the request router. In some implementations, the electronic access request can be or can include an HTTP header. The HTTP header can include the third-party identifier. For instance, the electronic access request can be an HTTP request. In some implementations, an electronic access request may not include a customer identifier. For instance, a third-party computing system may request to perform an electronic account action that is agnostic to customer identifier, such as accessing all customer identifiers serviced by the third-party.

At 704, the method 700 includes communicating, from the request router, the third-party identifier and the electronic account action to an authorization platform implemented by a policy engine. For instance, when the request router receives the electronic access request, it can provide information about the electronic access request, such as the third-party identifier, electronic account action, access token, etc., and/or the request itself, to the authorization platform. The policy engine can be any suitable policy engine, such as Open Policy Agent (OPA). The policy engine, such as OPA, can provide a unified toolset and framework for providing policy language, policy models, policy APIs, etc. for one or more services, such as transactional services. The policy engine can provide a high-level declarative language that facilitates specifying policy as code or APIs to offload policy decision-making from the core software. Additionally, the authorization platform can be separate from the core system. For instance, the authorization platform and the core system can be implemented on computing systems that do not utilize common hardware. As another example, the authorization platform and the core system can be implemented in unique containers of a cloud computing environment on same and/or distinct computing systems.

In some implementations, the authorization platform can include an administration layer. The administration layer can manage, initialize, active or deactivate, and/or otherwise orchestrate the authorization clients. For instance, the administration layer can include one or more administration layer servers that can be in communication with the authorization clients. In some implementations, the administration layer can include one or more OPAL servers.

In some implementations, the core system is a single core system. Managing a single core system using an authorization platform can be beneficial, as a single core system can provide a more uniform dataset of customers and accounts. However, in some cases, multiple core systems are included in a transactional systems. Systems and methods described herein can be extended to multiple core systems. Systems and methods described herein can be especially beneficial in providing a unified access point for multiple core systems.

At 706, the method 700 includes accessing entitlement data associated with the core system by one or more authorization clients of the authorization platform. In particular, the authorization clients can maintain entitlement data associated with the core system. The authorization platform can include one or more event listeners configured to listen for events at the core system, an administration layer configured to receive the events, and one or more authorization clients that update the entitlement data based on the events. For instance, the event listener can be configured to consume outputs from an event engine of the core system. The authorization clients may each separately maintain a cache of entitlement data. Alternatively, in some implementations, the entitlement data can be maintained in an entitlement repository that is managed by one or more authorization clients. For instance, each authorization client can separately or collectively update the entitlement data in the entitlement repository based on events that occur at a core system. In some implementations, the authorization clients can include Open Policy Agent clients.

The entitlement data can include one or more entitlement rules. For instance, the entitlement rules can define permissions regarding customer identifiers, action types, account identifiers, or other suitable data within the core system. As one example, in some implementations, the entitlement data can include relationship data defining relationships between entity identifiers (e.g., third-party identifiers or customer identifiers) and entitlements, such as accounts, action types, etc. As another example, the entitlement data can include account relationship data defining relationships between account identifiers and entitlements, such as customer identifiers, action types, etc. As another example, the entitlement data can include third-party authorization data defining entitlements for certain third-party computing systems (e.g., third-party providers). As an example, a given third-party provider can be authorized on behalf of some subset of customer identifiers serviced by that third-party provider.

At 708, the method 700 includes computing an entitlement decision based on the entitlement data, the third-party identifier, and the electronic account action. For instance, the entitlement decision can determine whether the request router forwards the electronic access request to the core system or rejects the electronic access request. In particular, the authorization platform can access the entitlement data at the entitlement repository. Additionally and/or alternatively, the authorization platform can access one or more policy rules from the policy repository, which may be cached at the authorization clients. Based on the entitlement data and data from the electronic access request, such as the third-party identifier, customer identifier, electronic account action, access token, expiry, etc., the authorization platform can determine whether the entitlement decision is an allow decision or a deny decision. For example, the authorization platform can determine whether the access token associated with the electronic access request is valid (e.g., matches the customer identifier, timestamp, expiry etc.). For instance, in some implementations, computing the entitlement decision includes computing that an access token associated with the electronic access request is valid.

In some implementations, computing the entitlement decision includes computing that the third-party computing system is authorized to act on behalf of the customer identifier. For example, the entitlement data can include relationships between customer identifiers and recognized third-party intermediaries (e.g., transactional service providers). The authorization platform can compare the third-party computing system and customer identifier to the relationships of the entitlement data to determine whether the third-party computing system is associated with the customer identifier and entitled to act on behalf of the customer associated with the customer identifier.

In some implementations, computing the entitlement decision includes computing that the third-party computing system is authorized to access one or more resources associated with the electronic account action. For instance, the entitlement data can include relationship data between customer identifiers and resources (e.g., accounts) that the customer identifiers are entitled to access, such as account relationship data defining relationships between customer identifiers and accounts. The authorization platform can compare the relationships of the entitlement data to the customer identifier and resources of the electronic access request to determine whether the customer identifier is permitted to access the resources in the electronic access request.

In some implementations, computing the entitlement decision includes computing that the third-party computing system is authorized to perform an action type of the electronic account action. For instance, the electronic account action can have one or more action types specifying the type of action to be performed by the core system, such as an account association, transfer, withdrawal, closing, opening, or other action. The entitlement data can define action type relationships between third-party computing systems, customer identifiers, and/or permitted action types for the given third-party computing system or customer identifier. In some implementations, the action type relationships may further be defined relative to specific accounts. For instance, a given customer can have entitlements for a first set of action types for a first account associated with the customer identifier and a second set of action types for a second account associated with the customer identifier.

At 710, the method 700 includes performing an action associated with the core system based on the entitlement decision. For instance, a computing system can allow or deny the electronic access request and/or perform one or more actions at the core system based on the entitlement decision. In some implementations, performing an action associated with the core system based on the entitlement decision includes computing that the entitlement decision is an allow decision. For instance, the authorization platform can determine that the electronic access request is a properly entitled request. In some implementations, computing that the entitlement decision is an allow decision includes at least one of: validating an access token associated with the electronic access request; verifying that the third-party computing system is authorized to act on behalf of the customer identifier; verifying that the third-party computing system is authorized to access one or more resources associated with the electronic account action; or verifying that the third-party computing system is authorized to perform an action type associated with the electronic account action. For instance, if each condition is satisfied, the electronic access request can be allowed. In response to computing that the entitlement decision is an allow decision, the computing system can communicate the electronic access request to the core system such that the core system can perform the electronic account action.

In some implementations, performing an action associated with the core system based on the entitlement decision includes computing that the entitlement decision is a deny decision and, in response to computing that the entitlement decision is a deny decision, communicating a deny message to the third-party computing system. For instance, in some implementations, if the authorization platform rejects the electronic access request, the request router and/or another system can communicate a deny message to the third-party computing system. The deny message can inform the third-party computing system that the electronic access request was rejected. In some implementations, the deny message can include a reason why the electronic access request was rejected, such as data informing the third-party computing system that it lacked proper entitlements.

Figure 8:
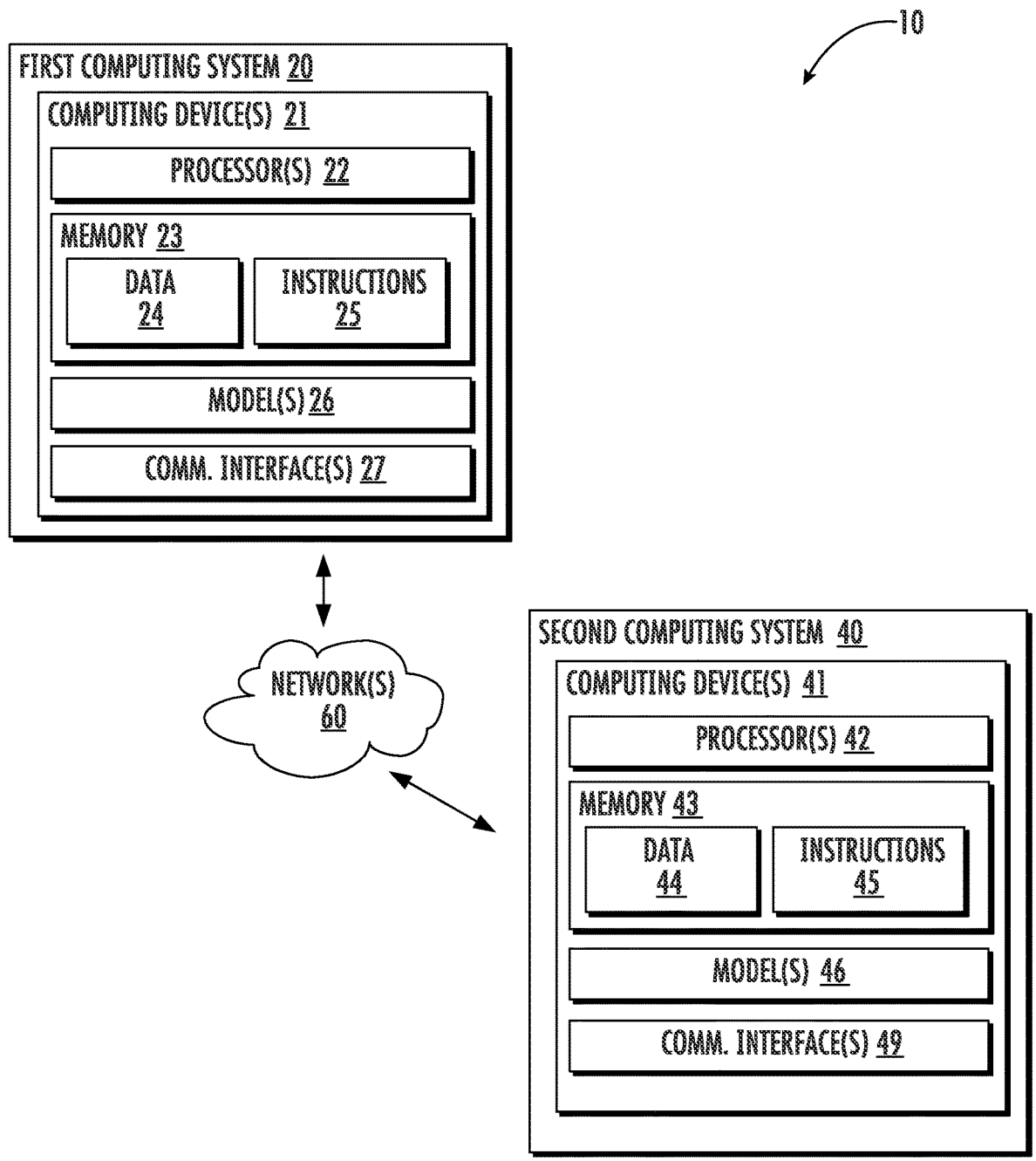
FIG. 8 is a block diagram of an example computing system for performing according to some implementations of the present disclosure.

FIG. 8 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing 40 can implement one or more of the systems, operations, or functionalities described herein (e.g., global data management framework 100, one or more portions thereof, such as global data manager 120, global viewport 130, etc.).

In some implementations, the first computing system 20 can be included in a client computing system, terminal computing system, endpoint/edge computing system, etc. In other implementations, the first computing system 20 may not be included in a client computing system. The first computing system 20 can include one or more distinct physical computing devices 21, such as a server and a thin client, etc.

The first computing system 20 (e.g., the computing device(s) 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. The memory 23 can include one or more non-transitory computer-readable storage media, such as RAM, ROM, EEPROM, EPROM, one or more memory devices, flash memory devices, etc., and combinations thereof.

The memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, data objects, data records, documents (e.g., imaged documents, transcribed documents, etc.), or any data or information described herein. In some implementations, the first computing system 20 can obtain data from one or more memory device(s) that are remote from the first computing system 20, such as one or more cloud storage services.

The memory 23 can store computer-readable instructions 25 that can be executed by the one or more processors 22. The instructions 25 can be software written in any suitable programming language or can be implemented in hardware. Additionally, or alternatively, the instructions 25 can be executed in logically or virtually separate threads on the processor(s) 22.

For example, the memory 23 can store instructions 25 that are executable by one or more processors (e.g., by the one or more processors 22, by one or more other processors, etc.) to perform (e.g., with the computing device(s) 21, the first computing system 20, or other system(s) having processors executing the instructions) any of the operations, functions, or methods/processes (or portions thereof) described herein.

In some implementations, the first computing system 20 can store or include one or more models 26. In some implementations, the models 26 can be or can otherwise include one or more machine-learned models (e.g., a machine-learned operational system, etc.). As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the models 26 can include data models, such as one or more protocols or schemas for structuring interactions with and updates to a database, data table, or other data storage mechanism.

In some implementations, the first computing system 20 can obtain the one or more models 26 using communication interface(s) 27 to communicate with the second computing system 40 over the network(s) 60. For instance, the first computing system 20 can store the model(s) 26 (e.g., one or more machine-learned models) in the memory 23. The first computing system 20 can then use or otherwise implement the models 26 (e.g., by the processors 22).

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

The memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, data objects, data records, documents (e.g., imaged documents, transcribed documents, etc.), or any data or information described herein. In some implementations, the second computing system 40 can obtain data from one or more memory device(s) that are remote from the second computing system 40.

The memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processor(s) 42.

For example, the memory 43 can store instructions 45 that are executable (e.g., by the one or more processors 42, by the one or more processors 22, by one or more other processors, etc.) to perform (e.g., with the computing device(s) 41, the second computing system 40, or other system(s) having processors for executing the instructions, such as computing device(s) 21 or the first computing system 20) any of the operations, functions, or methods/processes described herein.

In some implementations, the second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

Additionally, or alternatively to, the model(s) 26 at the first computing system 20, the second computing system 40 can include one or more models 46. As examples, the model(s) 46 can be or can otherwise include various machine-learned models (e.g., a machine-learned operational system, etc.) such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the models 46 can include data models, such as one or more protocols or schemas for structuring interactions with and updates to a database, data table, or other data storage mechanism.

In some implementations, the second computing system 40 or the first computing system 20 can train one or more machine-learned models of the model(s) 26 or the model(s) 46 through the use of one or more model trainers 47 and training data 48. The model trainer(s) 47 can train any one of the model(s) 26 or the model(s) 46 using one or more training or learning algorithms. One example training technique is backwards propagation of errors. In some implementations, the model trainer(s) 47 can perform supervised training techniques using labeled training data. In other implementations, the model trainer(s) 47 can perform unsupervised training techniques using unlabeled training data. In some implementations, the second computing system 40 can implement simulations for obtaining the training data 48 or for implementing the model trainer(s) 47 for training or testing the model(s) 26 or the model(s) 46. In some implementations, the model trainer(s) 47 can perform a number of generalization techniques to improve the generalization capability of the model(s) being trained. Generalization techniques include weight decays, dropouts, or other techniques.

For example, in some implementations, the second computing system 40 can generate training data 48 according to example aspects of the present disclosure. For instance, the second computing system 40 can generate training data 48. For instance, the second computing system 40 can implement methods according to example aspects of the present disclosure. The second computing system 40 can use the training data 48 to train model(s) 26. In this manner, for instance, the second computing system 40 can provide a training pipeline for training model(s) 26.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network(s) 60). In some implementations, the communication interfaces 27, 49 can include, for example, one or more of a communications controller, receiver, transceiver, transmitter, port, conductors, software or hardware for communicating data.

The network(s) 60 can be any type of network or combination of networks that allows for communication between devices. In some implementations, the network(s) can include one or more of a local area network, wide area network, the Internet, secure network, cellular network, mesh network, peer-to-peer communication link or some combination thereof and can include any number of wired or wireless links. Communication over the network(s) 60 can be accomplished, for instance, through a network interface using any type of protocol, protection scheme, encoding, format, packaging, etc.

FIG. 8 illustrates one example computing ecosystem 10 that can be used to implement the present disclosure. Other systems can be used as well. For example, in some implementations, the first computing system 20 can include the model trainer(s) 47 and the training data 48. In such implementations, the model(s) 26, 46 can be both trained and used locally at the first computing system 20. As another example, in some implementations, the computing system 20 may not be connected to other computing systems. Additionally, components illustrated or discussed as being included in one of the computing systems 20 or 40 can instead be included in another one of the computing systems 20 or 40.

Computing tasks discussed herein as being performed at computing device(s) remotely can instead be performed locally, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

What is claimed is:

1. A computer-implemented method, comprising:
    initializing an authorization platform implemented by a policy engine, the authorization platform comprising an event listener configured to listen for events at a core system and one or more authorization clients storing entitlement data, the entitlement data comprising one or more entitlement rules;
    computing, by the event listener, that an event has occurred at the core system;
    computing, by the event listener, that the event is an entitlement event; communicating event data descriptive of the event to an administration layer of the authorization platform, the administration layer in communication with the one or more authorization clients;
    communicating the event data to the one or more authorization clients;
    generating, by the one or more authorization clients, updated entitlement data based on the event data;
    updating the entitlement data at the one or more authorization clients based on the updated entitlement data; and
    computing an entitlement decision for an electronic access request from a third-party computing system, the electronic access request associated with a third-party identifier and an electronic account action, based on the entitlement data, the third-party identifier, and the electronic account action.

2. The computer-implemented method of claim 1, wherein initializing the authorization platform comprises:
    retrieving one or more entitlement rules for the administration layer;
    communicating configuration information to each of the authorization clients, the configuration information describing instructions for retrieving entitlement data from the administration layer;
    requesting, by the authorization clients, the entitlement data using the configuration information;
    obtaining the entitlement data from the core system; and
    providing the entitlement data to the authorization clients.

3. The computer-implemented method of claim 1, wherein the authorization clients comprise Open Policy Agent clients.

4. The computer-implemented method of claim 1, wherein the administration layer comprises an OPAL server.

5. The computer-implemented method of claim 1, wherein the entitlement data comprises customer relationship data, account relationship data, or third-party authorization data.

6. The computer-implemented method of claim 1, wherein the core system comprises a multiple core system.

7. A computing system, comprising:
    a core system, the core system comprising an event engine and one or more interfaces, the event engine configured to publish events at the core system;
    an authorization platform, comprising:
        one or more authorization clients configured to maintain entitlement data of the core system in a cache separate from the core system, the entitlement data comprising one or more entitlement rules;
        one or more event listeners configured to listen to the event engine of the core system, and
        one or more administration layer servers capable of configuring the one or more authorization clients;
    a request router configured to route incoming electronic access requests to the authorization platform;
    one or more processors; and
    one or more non-transitory, computer-readable media storing instructions that, when implemented, cause the one or more processors to perform operations, the operations comprising:
    initializing the authorization platform;
    computing, by the event listener, that an event has occurred at the core system;
    computing, by the event listener, that the event is an entitlement event;
    communicating event data descriptive of the event to the one or more administration layer servers;
    communicating the event data to the one or more authorization clients;
    generating, by the one or more authorization clients, updated entitlement data based on the event data;
    updating the entitlement data at the one or more authorization clients based on the updated entitlement data; and
    computing an entitlement decision for an electronic access request from a third-party computing system, the electronic access request associated with a third-party identifier and an electronic account action, based on the entitlement data, the third-party identifier, and the electronic account action.

8. The computing system of claim 7, wherein the operations further comprise:
    obtaining, by the request router, the electronic access request from the third-party computing system;
    accessing the entitlement data at the one or more authorization clients;
    computing that the entitlement decision is an allow decision; and in response to computing that the entitlement decision is an allow decision, communicating the electronic access request to the core system such that the core system can perform the electronic account action.

9. The computing system of claim 7, wherein the entitlement data comprises customer relationship data, account relationship data, or third-party authorization data.

10. The computing system of claim 7, wherein the core system comprises a single core system.

11. A computer-implemented method comprising:
receiving, at a request router, an electronic access request from a third-party computing system, the electronic access request associated with a third-party identifier and an electronic account action performable at a core system separate from the request router;
communicating, from the request router, the third-party identifier and the electronic account action to an authorization platform implemented by a policy engine, the authorization platform separate from the core system;
accessing entitlement data associated with the core system, wherein the authorization platform comprises one or more event listeners configured to determine whether an event has occurred at the core system, and wherein the authorization platform comprises one or more authorization clients configured to update the entitlement data based on the event;
computing an entitlement decision based on the entitlement data, the third-party identifier, and the electronic account action; and
performing an action associated with the core system based on the entitlement decision.

12. The computer-implemented method of claim 11, wherein computing the entitlement decision comprises computing that an access token associated with the electronic access request is valid.

13. The computer-implemented method of claim 11, wherein computing the entitlement decision comprises computing that the third-party computing system is authorized to act on behalf of a customer identifier.

14. The computer-implemented method of claim 11, wherein computing the entitlement decision comprises computing that the third-party computing system is authorized to access one or more resources associated with the electronic account action.

15. The computer-implemented method of claim 11, wherein computing the entitlement decision comprises computing that the third-party computing system is authorized to perform an action type of the electronic account action.

16. The computer-implemented method of claim 11, wherein the electronic access request comprises an HTTP header, the HTTP header comprising the third-party identifier.

17. The computer-implemented method of claim 11, wherein the core system comprises a multiple core system.

18. The computer-implemented method of claim 11, wherein performing an action associated with the core system based on the entitlement decision comprises:
computing that the entitlement decision is an allow decision; and
in response to computing that the entitlement decision is an allow decision, communicating the electronic access request to the core system such that the core system can perform the electronic account action.

19. The computer-implemented method of claim 18, wherein computing that the entitlement decision is an allow decision comprises at least one of: validating an access token associated with the electronic access request; verifying that the third-party computing system is authorized to act on behalf of a customer identifier; verifying that the third-party computing system is authorized to access one or more resources associated with the electronic account action, or verifying that the third-party computing system is authorized to perform an action type associated with the electronic account action.

20. The computer-implemented method of claim 11, wherein performing an action associated with the core system based on the entitlement decision comprises:
computing that the entitlement decision is a deny decision; and
in response to computing that the entitlement decision is a deny decision, communicating a deny message to the third-party computing system.

* * * * *